United States Patent
Niwata et al.

(10) Patent No.: US 12,394,791 B2
(45) Date of Patent: Aug. 19, 2025

(54) POSITIVE ELECTRODE ACTIVE MATERIAL FOR SECONDARY BATTERY, POSITIVE ELECTRODE FOR SECONDARY BATTERY, AND SECONDARY BATTERY

(71) Applicant: MURATA MANUFACTURING CO., LTD., Kyoto (JP)

(72) Inventors: Yuki Niwata, Kyoto (JP); Saurabh Ranjan, Kyoto (JP); Kensuke Sameshima, Kyoto (JP); Yosuke Hosoya, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 504 days.

(21) Appl. No.: 18/089,366

(22) Filed: Dec. 27, 2022

(65) Prior Publication Data

US 2023/0139370 A1    May 4, 2023

Related U.S. Application Data

(63) Continuation of application No. PCT/JP2021/009522, filed on Mar. 10, 2021.

(30) Foreign Application Priority Data

Jul. 27, 2020  (JP) ................. 2020-126633

(51) Int. Cl.
  *H01M 4/525*   (2010.01)
  *H01M 10/0525*  (2010.01)
  *H01M 4/02*    (2006.01)

(52) U.S. Cl.
  CPC ....... *H01M 4/525* (2013.01); *H01M 10/0525* (2013.01); *H01M 2004/028* (2013.01)

(58) Field of Classification Search
  None
  See application file for complete search history.

(56) References Cited

U.S. PATENT DOCUMENTS

| | | | |
|---|---|---|---|
| 2011/0059367 A1* | 3/2011 | Morita | H01M 10/052 429/231.95 |
| 2014/0230258 A1 | 8/2014 | Eagleton et al. | |
| 2018/0019464 A1 | 1/2018 | Umicore et al. | |
| 2018/0102536 A1 | 4/2018 | Kawakami et al. | |
| 2018/0145368 A1 | 5/2018 | Ochiai et al. | |

OTHER PUBLICATIONS

International Search Report of corresponding PCT application PCT/JP2021/009522, dated May 11, 2021.

* cited by examiner

*Primary Examiner* — Carlos Barcena
(74) *Attorney, Agent, or Firm* — K&L Gates LLP (57) ABSTRACT

A secondary battery includes a positive electrode including a positive electrode active material, a negative electrode, and an electrolytic solution. The positive electrode active material includes a lithium composite oxide of a layered rock-salt type. The lithium composite oxide includes lithium, cobalt, aluminum, magnesium, an additional element, and oxygen as constituent elements. The additional element includes at least one of fluorine, phosphorus, or sulfur. According to an analysis of the positive electrode active material by inductively coupled plasma optical emission spectrometry, a content of aluminum is greater than a content of magnesium. According to an analysis of a surface of the positive electrode active material by X-ray photoelectron spectroscopy, a sum of an abundance of chemical bonds between magnesium and oxygen and an abundance of chemical bonds between magnesium and the additional element is greater than a sum of an abundance of chemical bonds between aluminum and oxygen and an abundance of chemical bonds between aluminum and the additional element.

8 Claims, 3 Drawing Sheets

POSITIVE ELECTRODE ACTIVE MATERIAL FOR SECONDARY BATTERY, POSITIVE ELECTRODE FOR SECONDARY BATTERY, AND SECONDARY BATTERY

CROSS REFERENCE TO RELATED APPLICATIONS

The present application is a continuation of PCT patent application no. PCT/JP2021/009522, filed on Mar. 10, 2021, which claims priority to Japanese patent application no. JP2020-126633, filed on Jul. 27, 2020, the entire contents of which are herein incorporated by reference.

BACKGROUND

The present technology relates to a positive electrode active material for a secondary battery, a positive electrode for a secondary battery, and a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode (a positive electrode for a secondary battery), a negative electrode, and an electrolytic solution. The positive electrode includes a positive electrode active material (a positive electrode active material for a secondary battery) that is to be involved in charging and discharging reactions.

A configuration of the secondary battery has been considered in various ways. Specifically, in order to suppress elution of cobalt from a positive electrode active material, fluorine and an element such as zirconium are adhered to a surface of a lithium transition metal oxide including cobalt. In order to suppress a decrease in capacity during charging and discharging, a positive electrode active material is used which includes lithium, a transition metal, and oxygen in a first region (an internal portion), and magnesium, fluorine, and oxygen in a second region (a surface portion and a part of the internal portion). In order to obtain a superior charging and discharging cycle durability, a mixture of a raw material compound of lithium, a raw material compound of an N element, such as cobalt, a raw material compound of an M element, such as aluminum, a raw material compound of an L element, such as phosphorus, and a raw material compound of fluorine is fired in an oxygen-containing atmosphere to thereby manufacture a lithium-containing composite oxide.

SUMMARY

The present technology relates to a positive electrode active material for a secondary battery, a positive electrode for a secondary battery, and a secondary battery.

Although consideration has been given in various ways to improve performance of a secondary battery, an initial capacity characteristic, a cyclability characteristic, and a storage characteristic of the secondary battery still each remain insufficient. Accordingly, there is still room for improvement in terms of these characteristics.

The present technology has been made in view of such an issue, and to provide a positive electrode active material for a secondary battery, a positive electrode for a secondary battery, and a secondary battery that are each able to achieve a superior initial capacity characteristic, a superior cyclability characteristic, and a superior storage characteristic according to an embodiment.

A positive electrode active material for a secondary battery according to an embodiment includes a lithium composite oxide of a layered rock-salt type, and the lithium composite oxide includes lithium, cobalt, aluminum, magnesium, an additional element, and oxygen as constituent elements. The additional element A includes at least one of fluorine, phosphorus, or sulfur. According to an analysis by inductively coupled plasma optical emission spectrometry, a content of aluminum is greater than a content of magnesium. In addition, according to an analysis of a surface by X-ray photoelectron spectroscopy, a sum of an abundance of chemical bonds between magnesium and oxygen and an abundance of chemical bonds between magnesium and the additional element is greater than a sum of an abundance of chemical bonds between aluminum and oxygen and an abundance of chemical bonds between aluminum and the additional element.

A positive electrode for a secondary battery according to an embodiment includes a positive electrode active material, and the positive electrode active material has a configuration similar to that of the positive electrode active material for a secondary battery according to an embodiment described above.

A secondary battery according to an embodiment includes a positive electrode, a negative electrode, and an electrolytic solution, and the positive electrode has a configuration similar to that of the positive electrode for a secondary battery according to the embodiment of the present technology described above.

As described above, the content of aluminum and the content of magnesium are measured by analyzing the positive electrode active material by inductively coupled plasma optical emission spectrometry. In addition, as described above, the abundance of chemical bonds between magnesium and oxygen, the abundance of chemical bonds between magnesium and the additional element, the abundance of chemical bonds between aluminum and oxygen, and the abundance of chemical bonds between aluminum and the additional element are measured by analyzing the surface of the positive electrode active material by X-ray photoelectron spectroscopy. Descriptions will be given later as to details of procedures for the respective analyses by inductively coupled plasma optical emission spectrometry and X-ray photoelectron spectroscopy.

According to the positive electrode active material, the positive electrode for a secondary battery, or the secondary battery of an embodiment, the positive electrode active material (the lithium composite oxide of the layered rock-salt type) includes lithium, cobalt, aluminum, magnesium, the additional element, and oxygen as constituent elements. Further, the condition described above is satisfied regarding the result of the analysis of the positive electrode active material by inductively coupled plasma optical emission spectrometry, and the other condition described above is satisfied regarding the result of the analysis of the surface of the positive electrode active material by X-ray photoelectron spectroscopy. Accordingly, it is possible to obtain a superior initial capacity characteristic, a superior cyclability characteristic, and a superior storage characteristic.

Note that effects of the present technology are not necessarily limited to those described herein and may include any of a series of effects.

DETAILED DESCRIPTION

One or more embodiments of the present technology are described below in further detail including with reference to the drawings.

A description is given first of a secondary battery according to an embodiment. A positive electrode active material for a secondary battery (hereinafter, simply referred to as a "positive electrode active material") according to an embodiment and a positive electrode for a secondary battery (hereinafter, simply referred to as a "positive electrode") according to an embodiment are each a portion or a component of the secondary battery, and are thus described together below.

The secondary battery to be described herein is a secondary battery that obtains a battery capacity using insertion and extraction of an electrode reactant, and includes a positive electrode, a negative electrode, and an electrolytic solution. The electrolytic solution is a liquid electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

The electrode reactant is not limited to a particular kind, and may specifically be a light metal such as an alkali metal or an alkaline earth metal. Examples of the alkali metal include lithium, sodium, and potassium, and examples of the alkaline earth metal include beryllium, magnesium, and calcium.

In the following, a description is given of an example case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
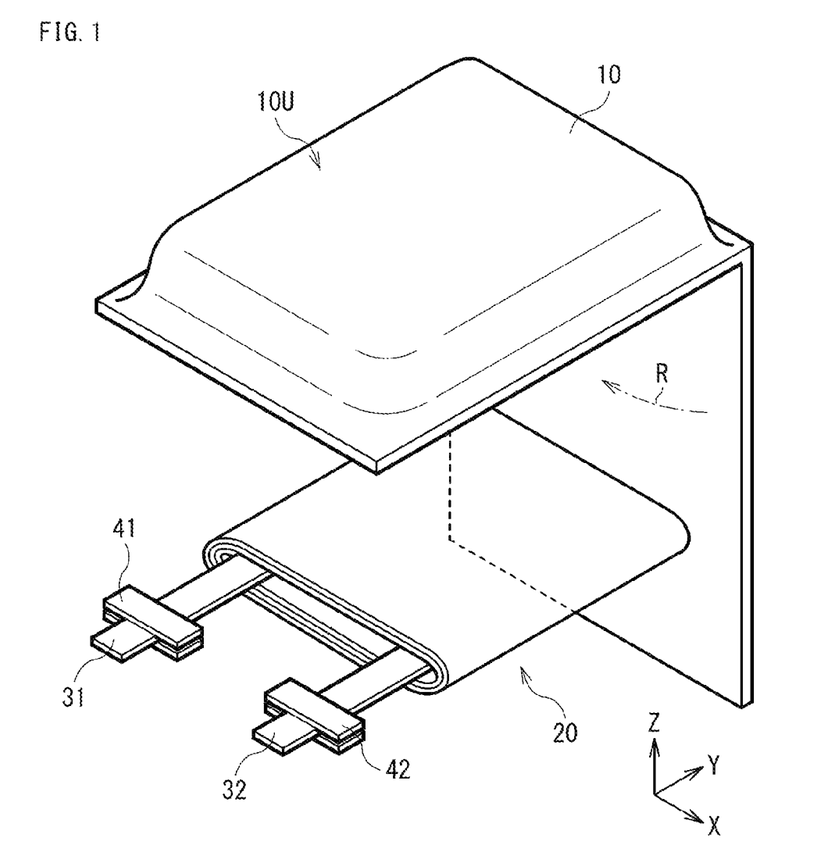
FIG. 1 is a perspective view of a configuration of a secondary battery according to an embodiment.
Figure 2:
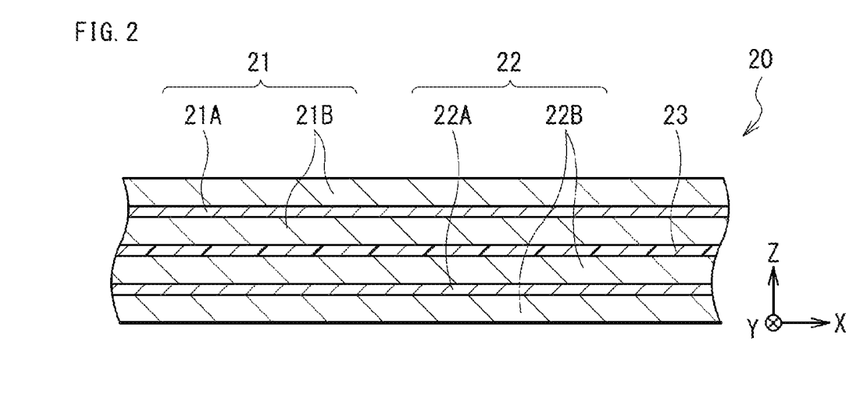
FIG. 2 is a sectional view of a configuration of a battery device illustrated in FIG. 1.

FIG. 1 illustrates a perspective configuration of the secondary battery. FIG. 2 illustrates a sectional configuration of a battery device 20 illustrated in FIG. 1. Note that FIG. 1 illustrates a state in which an outer package film 10 and the battery device 20 are separated away from each other, and FIG. 2 illustrates only a portion of the battery device 20.

As illustrated in FIGS. 1 and 2, the secondary battery includes the outer package film 10, the battery device 20, a positive electrode lead 31 and a negative electrode lead 32, and sealing films 41 and 42. The secondary battery described here is a secondary battery of a laminated-film type in which an outer package member having flexibility or softness, that is, the outer package film 10, is used as an outer package member to contain the battery device 20.

As illustrated in FIG. 1, the outer package film 10 is a flexible outer package member to contain the battery device 20, that is, for example, a positive electrode 21, a negative electrode 22, and an electrolytic solution to be described later. The outer package film 10 has a pouch-shaped structure.

Here, the outer package film 10 is a single film-shaped member and is foldable in a folding direction R. The outer package film 10 has a depression part 10U to place the battery device 20 therein. The depression part 10U is a so-called deep drawn part.

The outer package film 10 is not particularly limited in configuration (e.g., material and number of layers). The outer package film 10 may thus be single-layered film or a multilayered film.

Here, the outer package film 10 is a three-layered laminated film including a fusion-bonding layer, a metal layer, and a surface protective layer that are stacked in this order from an inner side. The fusion-bonding layer includes a polymer compound such as polypropylene. The metal layer includes a metal material such as aluminum. The surface protective layer includes a polymer compound such as nylon. In a state where the outer package film 10 is folded, outer edges of the outer package film 10 (the fusion-bonding layer) opposed to each other are fusion-bonded to each other.

As illustrated in FIG. 1, the sealing films 41 and 42 are a sealing members that each prevent entry of, for example, outside air into the inside of the outer package film 10. The sealing film 41 is interposed between the outer package film 10 and the positive electrode lead 31. The sealing film 42 is interposed between the outer package film 10 and the negative electrode lead 32. Note that the sealing film 41, the sealing film 42, or both may be omitted.

Specifically, the sealing film 41 includes a polymer compound, such as polyolefin, that has adherence to the positive electrode lead 31. Examples of the polyolefin include polypropylene.

The sealing film 42 has a configuration similar to that of the sealing film 41 except that the sealing film 42 has adherence to the negative electrode lead 32. In other words, the sealing film 42 includes a polymer compound, such as polyolefin, that has adherence to the negative electrode lead 32.

As illustrated in FIGS. 1 and 2, the battery device 20 is a power generation device contained inside the outer package film 10, and includes the positive electrode 21, the negative electrode 22, a separator 23, and the electrolytic solution. The electrolytic solution is not illustrated.

Here, the battery device 20 is a so-called wound electrode body. Thus, in the battery device 20, the positive electrode 21 and the negative electrode 22 are stacked on each other with the separator 23 interposed therebetween, and the stack of the positive electrode 21, the negative electrode 22, and the separator 23 is wound about a winding axis. The winding axis is a virtual axis extending in a Y-axis direction. In other words, the positive electrode 21 and the negative electrode 22 are wound while being opposed to each other with the separator 23 interposed therebetween.

The battery device 20 has an flat three-dimensional shape. Accordingly, a section of the battery device 20 intersecting the winding axis described above, that is, a section of the battery device 20 along an XZ plane, has an flat shape defined by a major axis and a minor axis. The major axis is a virtual axis that extends in an X-axis direction and has a larger length than the minor axis. The minor axis is a virtual axis that extends in a Z-axis direction intersecting the X-axis direction and has a smaller length than the major axis. Here, the section of the battery device 20 has an flat, generally elliptical shape.

The positive electrode 21 is the positive electrode for a secondary battery according to an embodiment. As illustrated in FIG. 2, the positive electrode 21 includes a positive electrode current collector 21A and a positive electrode active material layer 21B. The positive electrode 21 includes a positive electrode active material to be involved in charging and discharging reactions, as will be described later.

The positive electrode current collector 21A has two opposed surfaces on each of which the positive electrode active material layer 21B is disposed. The positive electrode current collector 21A includes an electrically conductive material such as a metal material. Examples of the metal material include aluminum.

The positive electrode active material layer 21B includes a positive electrode active material that is the positive electrode active material for a secondary battery according to an embodiment of the present technology. Lithium is insertable and extractable into/from the positive electrode active material. Here, the positive electrode active material layer 21B is disposed on each of the two opposed surfaces of the positive electrode current collector 21A. Note that the positive electrode active material layer 21B may further include, for example, a positive electrode binder and a positive electrode conductor. Alternatively, the positive electrode active material layer 21B may be disposed only on one of the two opposed surfaces of the positive electrode current collector 21A. A method of forming the positive electrode active material layer 21B is not particularly limited, and specific examples thereof include a coating method.

The positive electrode active material includes one or more of lithium composite oxides of a layered rock-salt type. That is, the lithium composite oxide has a crystal structure of a layered rock-salt type. Specifically, the lithium composite oxide includes lithium, cobalt, aluminum, magnesium, an additional element, and oxygen as constituent elements. The additional element includes one or more of fluorine, phosphorus, or sulfur. A reason for this is that a high energy density is obtainable.

The lithium composite oxide is not particularly limited in composition as long as having the crystal structure of the layered rock-salt type and including a series of constituent elements including lithium, as described above. In particular, a molar ratio of cobalt is preferably greater than a molar ratio of each of aluminum, magnesium, and the additional element. That is, the lithium composite oxide preferably includes cobalt as a main component or a primary constituent element out of the constituent elements other than lithium and oxygen, i.e., cobalt, aluminum, magnesium, and the additional element. A reason for this is that a high energy density is obtainable.

Specifically, the lithium composite oxide preferably includes a compound represented by Formula (1) below. X in Formula (1) is the additional element described above.

$$Li_aCo_bAl_cMg_dX_eO_f \quad (1)$$

where:
X is one or more of F, P, or S; and
a, b, c, d, e, and f satisfy $0.90 \leq a \leq 1.10$, $0.80 \leq b \leq 0.98$, $0.001 \leq c \leq 0.3$, $0.0015 \leq d \leq 0.3$, $0 \leq e \leq 0.3$, and $1.8 \leq f \leq 2.1$.

Here, regarding a physical property of the positive electrode active material (the lithium composite oxide), predetermined conditions (physical property conditions) are satisfied in order to improve performance of the secondary battery. Details of the physical property conditions will be described later.

The positive electrode active material may further include one or more of lithium compounds together with the lithium composite oxide described above. Note that the lithium composite oxide described above is excluded from the lithium compound to be described here.

The term "lithium compound" is a generic term for a compound that includes lithium as a constituent element.

More specifically, the lithium compound is a compound that includes lithium and one or more transition metal elements as constituent elements. Note that the lithium compound may further include one or more other elements, that is, elements other than lithium and a transition metal element. Although not particularly limited in kind, the lithium compound is specifically an oxide, a phosphoric acid compound, a silicic acid compound, or a boric acid compound, for example. Specific examples of the oxide include $LiNiO_2$, $LiCoO_2$, and $LiMn_2O_4$. Specific examples of the phosphoric acid compound include $LiFePO_4$ and $LiMnPO_4$.

The positive electrode binder includes one or more of materials including, without limitation, a synthetic rubber and a polymer compound. Examples of the synthetic rubber include a styrene-butadiene-based rubber. Examples of the polymer compound include polyvinylidene difluoride. The positive electrode conductor includes an electrically conductive material such as a carbon material. Examples of the carbon material include graphite, carbon black, acetylene black, and Ketjen black. The electrically conductive material may be a metal material or a polymer compound, for example.

As illustrated in FIG. 2, the negative electrode 22 includes a negative electrode current collector 22A and a negative electrode active material layer 22B.

The negative electrode current collector 22A has two opposed surfaces on each of which the negative electrode active material layer 22B is disposed. The negative electrode current collector 22A includes an electrically conductive material such as a metal material. Examples of the metal material include copper.

The negative electrode active material layer 22B includes one or more of negative electrode active materials into which lithium is insertable and from which lithium is extractable. Here, the negative electrode active material layer 22B is disposed on each of the two opposed surfaces of the negative electrode current collector 22A. Note that the negative electrode active material layer 22B may further include, for example, a negative electrode binder and a negative electrode conductor, and may be disposed only on one of the two opposed surfaces of the negative electrode current collector 22A. Details of the negative electrode binder are similar to those of the positive electrode binder. Details of the negative electrode conductor are similar to those of the positive electrode conductor. A method of forming the negative electrode active material layer 22B is not particularly limited, and specifically includes one or more of methods including, without limitation, a coating method, a vapor-phase method, a liquid-phase method, a thermal spraying method, and a firing (sintering) method.

Examples of the negative electrode active material include a carbon material and a metal-based material. A reason for this is that a high energy density is obtainable. Examples of the carbon material include graphitizable carbon, non-graphitizable carbon, and graphite (natural graphite and artificial graphite). The term "metal-based material" is a generic term for a material that includes, as a constituent element or constituent elements, one or more elements among metal elements and metalloid elements that are each able to form an alloy with lithium. Examples of such metal elements and metalloid elements include silicon and tin. The metal-based material may be a simple substance, an alloy, a compound, a mixture of two or more thereof, or a material including two or more phases thereof. Specific examples of the metal-based material include $TiSi_2$ and $SiO_x$ ($0 < x \leq 2$ or $0.2 < x < 1.4$).

The separator 23 is an insulating porous film interposed between the positive electrode 21 and the negative electrode 22 as illustrated in FIG. 2, and allows lithium ions to pass therethrough while preventing contact or a short circuit between the positive electrode 21 and the negative electrode 22. The separator 23 includes a polymer compound such as polyethylene.

The positive electrode 21, the negative electrode 22, and the separator 23 are each impregnated with the electrolytic solution. The electrolytic solution includes a solvent and an electrolyte salt.

The solvent includes one or more of non-aqueous solvents (organic solvents) including, without limitation, a carbonic-acid-ester-based compound, a carboxylic-acid-ester-based compound, and a lactone-based compound. An electrolytic solution including a non-aqueous solvent is a so-called non-aqueous electrolytic solution. The electrolyte salt includes one or more of light metal salts including, without limitation, a lithium salt.

As illustrated in FIG. 1, the positive electrode lead 31 is a positive electrode terminal coupled to the battery device 20 (the positive electrode 21), and is led out from inside to outside the outer package film 10. The positive electrode lead 31 includes an electrically conductive material such as aluminum. The positive electrode lead 31 has a shape such as a thin plate shape or a meshed shape.

As illustrated in FIG. 1, the negative electrode lead 32 is a negative electrode terminal coupled to the battery device 20 (the negative electrode 22). Here, the negative electrode lead 32 is led out from inside to outside the outer package film 10 in a direction similar to the direction in which the positive electrode lead 31 is led out. The negative electrode lead 32 includes an electrically conductive material such as copper. Details of a shape of the negative electrode lead 32 are similar to those of the shape of the positive electrode lead 31.

In the secondary battery, as described above, the predetermined physical property conditions are satisfied regarding the physical property of the positive electrode active material (the lithium composite oxide) in order to improve the performance (an initial capacity characteristic, a cyclability characteristic, and a storage characteristic).

Specifically, the following two conditions, i.e., physical property conditions 1 and 2 are both satisfied regarding results of analyses of the positive electrode active material (the lithium composite oxide), that is, a physical property of the positive electrode active material (the lithium composite oxide), obtained by two analysis methods. A reason for this is that the initial capacity characteristic, the cyclability characteristic, and the storage characteristic are each improved because a decomposition reaction of the electrolytic solution caused by reactivity of the positive electrode active material (the lithium composite oxide) is suppressed while the crystal structure of the positive electrode active material is stabilized during charging, for example. Details of the reason why the physical property conditions 1 and 2 are both satisfied will be described later.

(Physical Property Condition 1)

According to an analysis of the positive electrode active material by inductively coupled plasma (ICP) optical emission spectrometry, a content CA (ppm) of aluminum is greater than a content CM (ppm) of magnesium.

That is, in a case where the positive electrode active material as a whole is analyzed by ICP optical emission spectrometry to thereby measure the content CA of aluminum in the positive electrode active material and the content CM of magnesium in the positive electrode active material, the content CA is greater than the content CM.

Accordingly, in a case where the content CA of aluminum and the content CM of magnesium in the positive electrode active material as a whole are compared with each other, the content CA is greater than the content CM.

A procedure for measuring each of the content CA and the content CM by ICP optical emission spectrometry is as described below.

First, 0.1 g of the positive electrode active material is put into 15 ml (i.e., 15 $cm^3$) of hydrochloric acid having a concentration of 1 mol/kg, following which the hydrochloric acid is boiled. The positive electrode active material is thereby dissolved in the hydrochloric acid to thereby obtain a dissolved positive electrode active material. Thereafter, the dissolved positive electrode active material is evaporated to dryness to thereby obtain a sample for analysis. The sample is then diluted into 100 ml (i.e., 100 $cm^3$) with hydrochloric acid having a concentration of 0.1 mol/kg to thereby obtain a sample solution.

Thereafter, the sample solution is analyzed by means of an ICP optical emission spectrometer to thereby measure a concentration of aluminum in the sample solution and a concentration of magnesium in the sample solution. Used as the ICP optical emission spectrometer may be, for example, SPS3100, which is an ICP optical emission spectrometer of a sequential type manufactured by Hitachi High-Tech Science Corporation.

Lastly, the content CA of aluminum in the lithium composite oxide is calculated on the basis of the following expression: content CA (ppm)=weight of aluminum/weight of positive electrode active material. In addition, the content CM of magnesium in the lithium composite oxide is calculated on the basis of the following expression: content CM (ppm)=weight of magnesium/weight of positive electrode active material.

(Physical Property Condition 2)

As represented by Formula (1), X is the additional element. Thus, according to an analysis of a surface of the positive electrode active material by X-ray photoelectron spectroscopy (XPS), a sum PM of an abundance PMO of chemical bonds between magnesium and oxygen (Mg—O) and an abundance PMX of chemical bonds between magnesium and the additional element (Mg—X) is greater than a sum PA of an abundance PAO of chemical bonds between aluminum and oxygen (Al—O) and an abundance PAX of chemical bonds between aluminum and the additional element (Al—X).

That is, in a case where a portion (the surface) of the positive electrode active material is analyzed by XPS to thereby measure each of the abundances PMO, PMX, PAO, and PAX and calculate the sum PM of the abundance PMO and the abundance PMX and the sum PA of the abundance PAO and the abundance PAX, the sum PM is greater than the sum PA.

Accordingly, in the positive electrode active material as a whole, the abundance of aluminum (the content CA) is greater than the abundance of magnesium (the content CM) as described above, whereas, in the portion (at the surface) of the positive electrode active material, the abundance of magnesium is greater than the abundance of aluminum because the sum PM is greater than the sum PA as described above. In other words, in the positive electrode active material, magnesium is localized in the vicinity of the surface.

A procedure for measuring each of the abundances PMO, PMX, PAO, and PAX by XPS is as described below.

An analysis (an elemental analysis) of the surface of the positive electrode active material is performed by means of an XPS analyzer to thereby obtain analysis results (X-ray photoelectron spectroscopy spectra) regarding all elements contained in the lithium composite oxide. In this case, used as the XPS analyzer may be, for example, Quantera SXM, which is a scanning X-ray photoelectron spectrometer manufactured by ULVAC-PHI, Inc. Analysis conditions are as follows: X-ray source: monochromatic Al Kα beam (1486.6 eV); and X-ray spot size: 100 μm. The X-ray photoelectron spectroscopy spectra are each defined by a horizontal axis representing a binding energy (eV) and a vertical axis representing a spectrum intensity (the number of X-ray photoelectrons).

Thereafter, an atomic concentration of each of the elements at the surface is calculated on the basis of the X-ray photoelectron spectroscopy spectrum (a peak area of the number of photoelectrons for each of the elements) by means of a relative sensitivity factor manufactured by ULVAC-PHI, Inc., to thereby calculate the abundances PMO, PMX, PAO, and PAX. In this case, fitting (so-called peak fitting) is conducted by means of Multi-Pak, which is analysis software manufactured by ULVAC-PHI, Inc.

Specifically, in order to calculate the atomic concentration of magnesium (i.e., the abundances PMO and PMX) at the surface, fitting is conducted using four peaks, i.e., Peaks 1 to 4 at four peak positions (binding energies) described below on the basis of the X-ray photoelectron spectroscopy spectrum of Mg kLL with a binding energy within a range from 315 eV to 298 eV both inclusive. The abundance PMO of chemical bonds between magnesium and oxygen is thus obtained by calculating a peak area ratio on the basis of Peak 1 and Peak 3, and the abundance PMX of chemical bonds between magnesium and the additional element is thus obtained by calculating a peak area ratio on the basis of Peak 2 and Peak 4.

Peak 1: binding energy=from 303 eV to 306 eV both inclusive.
Peak 2: binding energy=peak position of Peak 1+2.48 eV
Peak 3: binding energy=peak position of Peak 2+5.38 eV
Peak 4: binding energy=peak position of Peak 3+7.03 eV In addition, in order to calculate the atomic concentration of aluminum (i.e., the abundances PAO and PAX) at the surface, fitting is conducted on the basis of a peak of the X-ray photoelectron spectroscopy spectrum of Al 2s with a binding energy within a range from 120 eV to 115 eV both inclusive, and a peak area is quantified. As a result, the abundance PAO of chemical bonds between aluminum and oxygen, and the abundance PAX of chemical bonds between aluminum and the additional element are calculated.

(Other Conditions)

The content CA is not particularly limited as long as the physical property condition 1 described above is satisfied. In particular, the content CA is preferably greater than or equal to 4500 ppm, and more preferably, less than or equal to 7800 ppm. That is, it is preferable that the content CA be within a range from 4500 ppm to 7800 ppm both inclusive. A reason for this is that the crystal structure of the positive electrode active material (the lithium composite oxide) is further stabilized, and the decomposition reaction of the electrolytic solution caused by the reactivity of the positive electrode active material is further suppressed.

In addition, each of the sums PM and PA is not particularly limited as long as the physical property condition 2 described above is satisfied. In particular, it is preferable that the sum PM be greater than or equal to 2.9, and the sum PA be less than or equal to 0.4. A reason for this is that the crystal structure of the positive electrode active material (the lithium composite oxide) is further stabilized, and the decomposition reaction of the electrolytic solution caused by the reactivity of the positive electrode active material is further suppressed.

Upon charging the secondary battery, in the battery device 20, lithium is extracted from the positive electrode 21 and the extracted lithium is inserted into the negative electrode 22 via the electrolytic solution. Upon discharging the secondary battery, in the battery device 20, lithium is extracted from the negative electrode 22 and the extracted lithium is inserted into the positive electrode 21 via the electrolytic solution. Upon the charging and discharging, lithium is inserted and extracted in an ionic state.

The positive electrode active material (the lithium composite oxide) is manufactured, following which the secondary battery is fabricated using the positive electrode active material.

In accordance with a procedure described below, the positive electrode active material (the lithium composite oxide) is manufactured.

First, as raw materials, a lithium source (a lithium compound), a cobalt source (a cobalt compound), and an aluminum source (an aluminum compound) are prepared.

The lithium compound includes one or more of compounds that each include lithium as a constituent element. Specifically, the lithium compound is, for example, an oxide, a carbonic acid salt, a sulfuric acid salt, or a hydroxide. Details of the cobalt compound are similar to those of the lithium compound described above except that the cobalt compound includes cobalt, instead of lithium, as a constituent element. Details of the aluminum compound are similar to those of the lithium compound described above except that the aluminum compound includes aluminum, instead of lithium, as a constituent element.

Here, the lithium compound, the cobalt compound, and the aluminum compound are each in a form of powder. In this case, an average particle size (a median diameter D50 (μm)) of each of the lithium compound, the cobalt compound, and the aluminum compound is not particularly limited and may thus be chosen as desired.

Thereafter, the lithium compound, the cobalt compound, and the aluminum compound are mixed with each other to thereby obtain a mixture. A mixture ratio among the lithium compound, the cobalt compound, and the aluminum compound, i.e., a molar ratio among lithium, cobalt, and aluminum may be set to any value depending on the composition of the positive electrode active material (the lithium composite oxide) to be finally manufactured. In this case, the mixture may be stirred by means of a stirring apparatus, such as a high-speed stirrer. Conditions including, without limitation, a stirring speed and a stirring time may be chosen as desired.

Thereafter, the mixture is fired and then allowed to cool slowly. The lithium compound, the cobalt compound, and the aluminum compound thereby react with each other to obtain a composite oxide including lithium, cobalt, and aluminum as constituent elements. Conditions including, without limitation, a firing temperature and a firing time may be chosen as desired.

Thereafter, as other raw materials, a magnesium source (a magnesium compound) and an additional element source (an additional compound) are prepared together with the aluminum compound described above. Details of the magnesium compound are similar to those of the lithium compound described above except that the magnesium compound includes magnesium, instead of lithium, as a constituent element. Details of the additional compound are similar to those of the lithium compound described above except that the additional compound includes the additional element, instead of lithium, as a constituent element.

Here, the magnesium compound and the additional compound are each in a form of powder. In this case, an average particle size (a median diameter D50 (μm)) of each of the magnesium compound and the additional compound is not particularly limited and may thus be chosen as desired.

Thereafter, the composite oxide, the aluminum compound, the magnesium compound, and the additional compound are mixed with each other to thereby obtain a precursor. A mixture ratio among the composite oxide, the aluminum compound, the magnesium compound, and the additional compound, i.e., a molar ratio between lithium, cobalt, aluminum, magnesium, and the additional element may be chosen as desired depending on the composition of the positive electrode active material (the lithium composite oxide) to be finally manufactured. In this case, the precursor may be stirred as in the case where the mixture described above is stirred.

Lastly, the precursor is fired under oxygen flow. The precursor, the aluminum compound, the magnesium compound, and the additional compound thereby react with each other to synthesize the lithium composite oxide including lithium, cobalt, aluminum, magnesium, and the additional element as constituent elements. Thus, the positive electrode active material (the lithium composite oxide) is obtained. Conditions including, without limitation, a firing temperature and a firing time may be chosen as desired.

In accordance with the following procedure, the secondary battery is manufactured using the positive electrode active material (the lithium composite oxide) described above.

The positive electrode active material and other materials including, without limitation, the positive electrode binder and the positive electrode conductor, are mixed with each other to thereby obtain a positive electrode mixture, following which the positive electrode mixture is put into a solvent such as an organic solvent to thereby prepare a paste-like positive electrode mixture slurry. Thereafter, the positive electrode mixture slurry is applied to each of the two opposed surfaces of the positive electrode current collector 21A to thereby form the positive electrode active material layer 21B. The positive electrode active material layer 21B may be compression-molded by means of, for example, a roll pressing machine. In this case, the positive electrode active material layer 21B may be heated. The positive electrode active material layer 21B may be compression-molded multiple times. In this manner, the positive electrode 21 is fabricated.

The negative electrode 22 is fabricated in accordance with a procedure similar to the above-described procedure for fabricating the positive electrode 21. Specifically, the negative electrode active material and other materials including, without limitation, the negative electrode binder and the negative electrode conductor, are mixed with each other to thereby obtain a negative electrode mixture, following which the negative electrode mixture is put into a solvent such as an organic solvent to thereby prepare a paste-like negative electrode mixture slurry. Thereafter, the negative electrode mixture slurry is applied to each of the two opposed surfaces of the negative electrode current collector 22A to thereby form the negative electrode active material layer 22B. Needless to say, the negative electrode active material layer 22B may be compression-molded. In this manner, the negative electrode 22 is fabricated.

The electrolyte salt is put into the solvent. The electrolyte salt is thereby dispersed or dissolved in the solvent. As a result, the electrolytic solution is prepared.

First, the positive electrode lead 31 is coupled to the positive electrode 21 (the positive electrode current collector 21A) by a method such as a welding method, and the negative electrode lead 32 is coupled to the negative electrode 22 (the negative electrode current collector 22A) by a method such as a welding method.

Thereafter, the positive electrode 21 and the negative electrode 22 are stacked on each other with the separator 23 interposed therebetween, following which the stack of the positive electrode 21, the negative electrode 22, and the separator 23 is wound to thereby fabricate a wound body. The wound body has a configuration similar to that of the battery device 20 except that the positive electrode 21, the negative electrode 22, and the separator 23 are each unimpregnated with the electrolytic solution. Thereafter, the wound body is pressed by means of, for example, a pressing machine to thereby shape the wound body into an flat shape.

Thereafter, the wound body is placed inside the depression part 10U, following which the outer package film 10 is folded to thereby cause portions of the outer package film 10 to be opposed to each other with the wound body interposed therebetween. Thereafter, outer edges of two sides of the outer package film 10 (the fusion-bonding layer) opposed to each other are fusion-bonded to each other by a method such as a thermal-fusion-bonding method. The wound body is thereby contained inside the outer package film 10 shaped like a pouch.

Lastly, the electrolytic solution is injected into the pouch-shaped outer package film 10, following which the outer edges of the remaining one side of the outer package film 10 (the fusion-bonding layer) are fusion-bonded to each other by a method such as a thermal-fusion-bonding method. In this case, the sealing film 41 is interposed between the outer package film 10 and the positive electrode lead 31, and the sealing film 42 is interposed between the outer package film 10 and the negative electrode lead 32. The wound body is thereby impregnated with the electrolytic solution. In this manner, the battery device 20 which is the wound electrode body is fabricated, and the battery device 20 is sealed in the pouch-shaped outer package film 10. Thus, the secondary battery is assembled.

The secondary battery after being assembled is charged and discharged. Conditions including, without limitation, an environment temperature, the number of times of charging and discharging (i.e., the number of cycles), and charging and discharging conditions may be chosen as desired. A film is thus formed on a surface of, for example, the negative electrode 22, which brings the secondary battery into an electrochemically stable state.

Thus, the secondary battery including the outer package film 10, that is, the secondary battery of the laminated-film type, is completed.

According to the secondary battery described above, the positive electrode active material (the lithium composite oxide of the layered rock-salt type) of the positive electrode 21 includes lithium, cobalt, aluminum, magnesium, the additional element, and oxygen as constituent elements. Further, the physical property condition 1 is satisfied regarding the result of the analysis of the positive electrode active material, i.e., the contents CA and CM, by ICP optical emission spectrometry, and the physical property condition 2 is satisfied regarding the result of the analysis of the surface of the positive electrode active material, i.e., the sums PA and PM, by XPS.

In this case, firstly, the lithium composite oxide includes aluminum as a constituent element, and aluminum ($Al^{3+}$) is located at a site of cobalt in the crystal structure of the lithium composite oxide. This stabilizes the crystal structure of the positive electrode active material.

Secondly, the lithium composite oxide includes magnesium as a constituent element, and a magnesium ion ($Mg^{2+}$) has an ionic radius similar to an ionic radius of a lithium ion. This allows magnesium to be located at a site of lithium in the crystal structure of the lithium composite oxide after lithium is discharged from the lithium composite oxide, which stabilizes the crystal structure of the positive electrode active material during charging.

Thirdly, the lithium composite oxide includes the additional element as a constituent element, and the additional element lowers the reactivity of the lithium composite oxide with the electrolytic solution. This suppresses a reaction between the positive electrode active material and the electrolytic solution at the surface of the positive electrode active material.

Fourthly, as the physical property condition 1 is satisfied regarding the result of the analysis of the positive electrode active material by ICP optical emission spectrometry, the lithium composite oxide as a whole includes a sufficient amount of aluminum as a constituent element. This allows aluminum to be easily located at the site of cobalt in the crystal structure of the lithium composite oxide as described above, which further stabilizes the crystal structure of the positive electrode active material.

Fifthly, as the physical property condition 2 is satisfied regarding the result of the analysis of the surface of the positive electrode active material by XPS, magnesium is localized in the vicinity of the surface of the lithium composite oxide. In this case, as the ionic radius of the magnesium ion ($Mg^{2+}$) is similar to the ionic radius of the lithium ion, magnesium is easily located at the site of lithium in the crystal structure of the lithium composite oxide. This allows magnesium to be preferentially located in the vicinity of the surface of the positive electrode active material over aluminum even if a lack of lithium has occurred during the manufacture of the positive electrode active material or during the firing of the precursor. Moreover, magnesium is fired together with the additional element during the manufacture of the positive electrode active material or the firing of the precursor. This causes magnesium to be easily localized in the vicinity of the surface of the lithium composite oxide and allows the magnesium localized in the vicinity of the surface of the lithium composite oxide to easily react with the additional element, which allows the chemical bond between magnesium and the additional element (Mg—X) to be easily located in the vicinity of the surface of the lithium composite oxide.

Thus, the decomposition reaction of the electrolytic solution caused by the reactivity of the positive electrode active material is suppressed while the crystal structure of the positive electrode active material (the lithium composite oxide) is stabilized during, for example, charging. Accordingly, it is possible to obtain a superior initial capacity characteristic, a superior cyclability characteristic, and a superior storage characteristic.

In particular, the molar ratio of cobalt may be greater than the molar ratio of each of aluminum, magnesium, and the additional element in the lithium composite oxide. This improves the energy density. Accordingly, it is possible to achieve higher effects.

The content CA of aluminum may be greater than or equal to 4500 ppm, and preferably, less than or equal to 7800 ppm. This further stabilizes the crystal structure of the positive electrode active material (the lithium composite oxide) and further suppresses the decomposition reaction of the electrolytic solution caused by the reactivity of the positive electrode active material. Accordingly, it is possible to achieve higher effects.

The sum PM may be greater than or equal to 2.9, and the sum PA may be less than or equal to 0.4. This further stabilizes the crystal structure of the positive electrode active material (the lithium composite oxide) and further suppresses the decomposition reaction of the electrolytic solution caused by the reactivity of the positive electrode active material. Accordingly, it is possible to achieve higher effects.

The secondary battery may include a lithium-ion secondary battery. This allows the secondary battery to stably obtain a sufficient battery capacity using insertion and extraction of lithium. Accordingly, it is possible to achieve higher effects.

Further, the positive electrode active material includes the lithium composite oxide of the layered rock-salt type having the composition described above and satisfies the physical property conditions 1 and 2 regarding the results of the analyses by ICP optical emission spectrometry and XPS. Accordingly, for the reasons similar to those in the case with the secondary battery described above, it is possible for the secondary battery including the positive electrode active material to achieve a superior initial capacity characteristic, a superior cyclability characteristic, and a superior storage characteristic.

Further, regarding the positive electrode 21, the positive electrode active material includes the lithium composite oxide of the layered rock-salt type having the composition described above and satisfies the physical property conditions 1 and 2 regarding the results of the analyses by ICP optical emission spectrometry and XPS. Accordingly, for the reasons similar to those in the case with the secondary battery described above, it is possible for the secondary battery including the positive electrode 21 to achieve a superior initial capacity characteristic, a superior cyclability characteristic, and a superior storage characteristic.

Next, a description is given of modifications of the above-described secondary battery according to an embodiment. The configuration of the secondary battery is appropriately modifiable as described below. Note that any two or more of the following series of modifications may be combined with each other.

The separator 23 which is a porous film is used. However, although not specifically illustrated here, a separator of a stacked type including a polymer compound layer may be used instead of the separator 23 which is the porous film.

Specifically, the separator of the stacked type includes a porous film having two opposed surfaces, and the polymer compound layer provided on one of or each of the two opposed surfaces of the porous film. A reason for this is that adherence of the separator to each of the positive electrode 21 and the negative electrode 22 improves to suppress the occurrence of misalignment of the battery device 20 (irregular winding of each of the positive electrode 21, the negative electrode 22, and the separator). This helps to prevent the secondary battery from easily swelling even if, for example, the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include several kinds of insulating particles. A reason for this is that such insulating particles dissipate heat upon heat generation by the secondary battery, thus improving safety or heat resistance of the secondary battery. The insulating particles include one or more kinds of inorganic particles and resin particles. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator of the stacked type, a precursor solution including, without limitation, the polymer compound and an organic solvent, is prepared, and thereafter the precursor solution is applied to one of or each of the two opposed surfaces of the porous film. In this case, the insulating particles may be added to the precursor solution on an as-needed basis.

Also in the case where the separator of the stacked type is used, lithium ions are movable between the positive electrode 21 and the negative electrode 22. Accordingly, it is possible to achieve similar effects.

The electrolytic solution which is a liquid electrolyte is used. However, although not specifically illustrated here, an electrolyte layer which is a gel electrolyte may be used instead of the electrolytic solution.

In the battery device 20 including the electrolyte layer, the positive electrode 21 and the negative electrode 22 are stacked on each other with the separator 23 and the electrolyte layer interposed therebetween, and the stack of the positive electrode 21, the negative electrode 22, the separator 23, and the electrolyte layer is wound. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound in the electrolyte layer. A reason for this is that liquid leakage of the electrolytic solution is prevented. The configuration of the electrolytic solution is as described above. The polymer compound includes, for example, polyvinylidene difluoride. In a case of forming the electrolyte layer, a precursor solution including, without limitation, the electrolytic solution, the polymer compound, and an organic solvent is prepared, and thereafter the precursor solution is applied to one side or both sides of the positive electrode 21 and one side or both sides of the negative electrode 22.

Also in the case where the electrolyte layer is used, lithium ions are movable between the positive electrode 21 and the negative electrode 22 via the electrolyte layer. Accordingly, it is possible to achieve similar effects.

Next, a description is given of applications (application examples) of the above-described secondary battery.

The applications of the secondary battery are not particularly limited. The secondary battery used as a power source may serve as a main power source or an auxiliary power source of, for example, electronic equipment or an electric vehicle. The main power source is preferentially used regardless of the presence of any other power source. The auxiliary power source is used in place of the main power source, or is switched from the main power source.

Specific examples of the applications of the secondary battery include: electronic equipment including portable electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home or industrial battery systems for accumulation of electric power for a situation such as emergency. In these applications, one secondary battery or a plurality of secondary batteries may be used.

The battery pack may include a single battery, or may include an assembled battery. The electric vehicle is a vehicle that operates (travels) using the secondary battery as a driving power source, and may be a hybrid automobile that is additionally provided with a driving source other than the secondary battery as described above. An electric power storage system for home use allows, for example, home appliances to be used by utilizing electric power accumulated in the secondary battery which is an electric power storage source.

One of application examples of the secondary battery will now be described in detail. The configuration of the application example described below is merely an example, and is appropriately modifiable.

Figure 3:
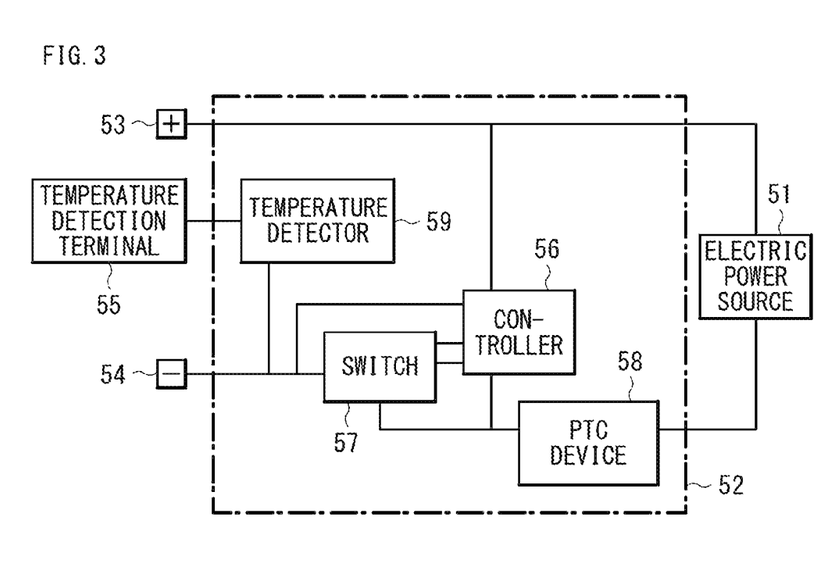
FIG. 3 is a block diagram illustrating a configuration of an application example of the secondary battery.

FIG. 3 illustrates a block configuration of a battery pack. The battery pack described here is a battery pack (a so-called soft pack) including one secondary battery, and is to be mounted on, for example, electronic equipment typified by a smartphone.

As illustrated in FIG. 3, the battery pack includes an electric power source 51 and a circuit board 52. The circuit board 52 is coupled to the electric power source 51, and includes a positive electrode terminal 53, a negative electrode terminal 54, and a temperature detection terminal 55.

The electric power source 51 includes one secondary battery. The secondary battery has a positive electrode lead coupled to the positive electrode terminal 53 and a negative electrode lead coupled to the negative electrode terminal 54. The electric power source 51 is couplable to outside via the positive electrode terminal 53 and the negative electrode terminal 54, and is thus chargeable and dischargeable. The circuit board 52 includes a controller 56, a switch 57, a thermosensitive resistive device (a PTC device) 58, and a temperature detector 59. However, the PTC device 58 may be omitted.

The controller 56 includes, for example, a central processing unit (CPU) and a memory, and controls an overall operation of the battery pack. The controller 56 detects and controls a use state of the electric power source 51 on an as-needed basis.

If a voltage of the electric power source 51 (the secondary battery) reaches an overcharge detection voltage or an overdischarge detection voltage, the controller 56 turns off the switch 57. This prevents a charging current from flowing into a current path of the electric power source 51. The overcharge detection voltage and the overdischarge detection voltage are not particularly limited. For example, the overcharge detection voltage is 4.2 V±0.05 V and the overdischarge detection voltage is 2.4 V±0.1 V.

The switch 57 includes, for example, a charge control switch, a discharge control switch, a charging diode, and a discharging diode. The switch 57 performs switching between coupling and decoupling between the electric power source 51 and external equipment in accordance with an instruction from the controller 56. The switch 57 includes, for example, a metal-oxide-semiconductor field-effect transistor (MOSFET). The charging and discharging currents are detected on the basis of an ON-resistance of the switch 57.

The temperature detector 59 includes a temperature detection device such as a thermistor. The temperature detector 59 measures a temperature of the electric power source 51 using the temperature detection terminal 55, and outputs a result of the temperature measurement to the controller 56. The result of the temperature measurement to be obtained by the temperature detector 59 is used, for example, in a case where the controller 56 performs charge/discharge control upon abnormal heat generation or in a case where the controller 56 performs a correction process upon calculating a remaining capacity.

EXAMPLES

A description is given of Examples of the present technology according to an embodiment.

Examples 1 to 10 and Comparative Examples 11 to 16

As described below, positive electrode active materials were manufactured, and secondary batteries for test use were manufactured using the positive electrode active materials, following which the secondary batteries were evaluated for their performance. Note that, in each of Tables 1 and 2 to be described later, in order to simplify the lists of these tables, Examples 1 to 10 are represented as Ex. 1 to 10, and Comparative Examples 11 to 16 are represented as Compar. 11 to 16.

Figure 4:
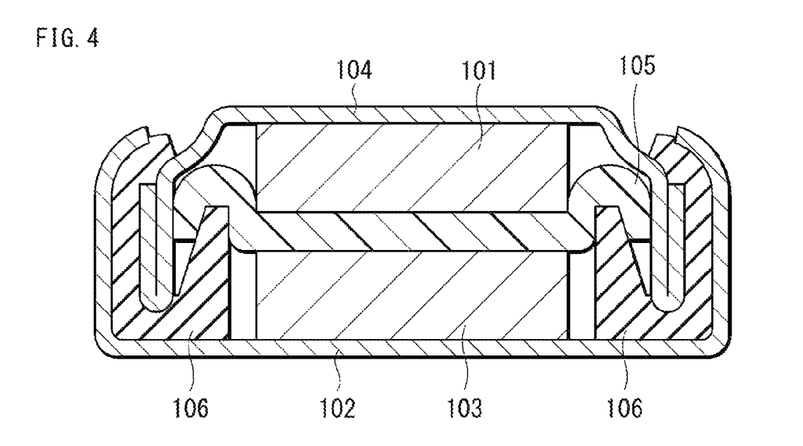
FIG. 4 is a sectional view of a configuration of a secondary battery for test use.

FIG. 4 illustrates a sectional configuration of the secondary battery for test use. The secondary battery is a secondary battery of a coin type including two metal outer package members, i.e., an outer package can 102 and an outer package cup 104. The outer package can 102 and the outer package cup 104 are fittable into each other.

As illustrated in FIG. 4, the secondary battery of the coin type includes a test electrode 101 placed inside the outer package cup 104, and includes a counter electrode 103 placed inside the outer package can 102. The test electrode 101 and the counter electrode 103 are stacked on each other with a separator 105 interposed therebetween, and the outer package can 102 and the outer package cup 104 are crimped to each other by means of a gasket 106. The test electrode 101, the counter electrode 103, and the separator 105 are each impregnated with an electrolytic solution.

[Manufacture of Positive Electrode Active Material]

In accordance with a procedure described below, the positive electrode active material (the lithium composite oxide) was manufactured.

First, as raw materials, the lithium compound (lithium carbonate ($Li_2CO_3$)) in a form of powder, the cobalt compound (cobalt oxide ($CoO_2$)) in a form of powder, and the aluminum compound (aluminum oxide ($Al_2O_3$)) in a form of powder were prepared. The average particle size (the median diameter D50 (μm)) of the aluminum compound was as given in Table 1.

Note that, in Table 1, the lithium compound, the cobalt compound, and the aluminum compound are represented as "Li compound", "Co compound", and "Al compound", respectively.

Thereafter, the lithium compound, the cobalt compound, and the aluminum compound were mixed with each other to obtain a mixture. In this case, the mixture ratio among the lithium compound, the cobalt compound, and the aluminum compound, i.e., the molar ratio among lithium, cobalt, and aluminum was 1.02:0.99:0.01. In addition, the mixture ratio of the aluminum compound was varied as indicated in Table 1 by varying the mixture ratio of the cobalt compound depending on the mixture ratio of the aluminum compound. Thereafter, the mixture was stirred by means of a high-speed stirrer. A stirring time (hour) was as given in Table 1.

Thereafter, the mixture was fired in the air at a firing temperature of 1050° C. for a firing time of eight hours, and thereafter allowed to cool slowly. As a result, a composite oxide in a form of powder was obtained. The composite oxide included lithium, cobalt, and aluminum as constituent elements. That is, the composite oxide was lithium cobalt oxide including aluminum. The composite oxide had an average particle size (a median diameter D50) of 20 μm and a specific surface area of 0.3 $m^2/g$.

Thereafter, as other raw materials, the magnesium compound (magnesium oxide ($MgO_2$)) in a form of powder and two additional compounds in a form of powder were further prepared together with the aluminum compound (aluminum oxide) in a form of powder described above. Prepared as the two additional compounds were: lithium fluoride (LiF) and magnesium fluoride ($MgF_2$) each including fluorine as an additional element; lithium phosphate ($Li_3PO_4$) and magnesium phosphate phosphorus ($Mg_3(PO_4)_2$) each including phosphorus as an additional element; and lithium sulfide ($Li_2S$) and magnesium sulfide (MgS) each including sulfur as an additional element. Hereinafter, the former of the two additional compounds described above is referred to as a "first additional compound", and the latter of the two additional compounds is referred to as a "second additional compound".

Note that, in Table 1, the magnesium compound is represented as "Mg compound".

Thereafter, 500 ppm of the aluminum compound, 500 ppm of the magnesium compound, 500 ppm of the first additional compound, and 250 ppm of the second additional compound were mixed with the composite oxide to thereby obtain a mixture. In this case, as given in Table 1, a mixture amount (ppm) of the aluminum compound and a mixture amount (ppm) of the magnesium compound were each varied.

Lastly, the mixture was fired under oxygen flow at a firing temperature of 800° C. for a firing time of five hours. The composite oxide (the lithium composite oxide) including lithium, cobalt, aluminum, magnesium, and the additional element as constituent elements was thereby synthesized in a form of powder. Thus, the positive electrode active material (the lithium composite oxide) was obtained.

A positive electrode active material for comparison was manufactured in accordance with a similar procedure except that the additional compound was not used. The positive electrode active material including no additional element as a constituent element was thereby manufactured.

[Manufacture of Secondary Battery]

In accordance with the following procedure, the secondary battery (the lithium-ion secondary battery) was manufactured using the positive electrode active material described above.

(Fabrication of Test Electrode)

First, 98 parts by mass of the positive electrode active material (the lithium composite oxide), 1.2 parts by mass of the positive electrode binder (polyvinylidene difluoride), and 0.8 parts by mass of the positive electrode conductor (Ketjen black which is amorphous carbon powder) were mixed with each other to thereby obtain a positive electrode mixture. Thereafter, the positive electrode mixture was put into an organic solvent (N-methyl-2-pyrrolidone), following which the organic solvent was stirred to thereby prepare a paste-like positive electrode mixture slurry. Thereafter, the positive electrode mixture slurry was applied to each of the two opposed surfaces of the positive electrode current collector (an aluminum foil having a thickness of 12 µm) by means of a coating apparatus, following which the applied positive electrode mixture slurry was dried with hot air to thereby form the positive electrode active material layer. Lastly, the positive electrode active material layer was compression-molded by means of a roll pressing machine, following which the positive electrode current collector on which the positive electrode active material layers were formed was punched into a disk shape having a diameter of 15 mm. As a result, the test electrode 101 (a positive electrode) was fabricated.

(Fabrication of Counter Electrode)

First, 95 parts by mass of the negative electrode active material (graphite) and 5 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby prepare a paste-like negative electrode mixture slurry. Thereafter, the negative electrode mixture slurry was applied to each of the two opposed surfaces of the negative electrode current collector (a copper foil having a thickness of 12 µm) by means of a coating apparatus, following which the applied negative electrode mixture slurry was dried with hot air to thereby form the negative electrode active material layer. Lastly, the negative electrode active material layer was compression-molded by means of a roll pressing machine, following which the negative electrode current collector on which the negative electrode active material layers were formed was punched into a disk shape having a diameter of 16 mm. As a result, the counter electrode 103 (a negative electrode) was fabricated.

(Preparation of Electrolytic Solution)

The electrolyte salt (lithium hexafluorophosphate (LiPF$_6$) which is a lithium salt) was put into the solvent (ethylene carbonate and propylene carbonate each of which is a carbonic-acid-ester-based compound), following which the solvent was stirred. In this case, the mixture ratio (weight ratio) between ethylene carbonate and propylene carbonate was 50:50, and the content of the electrolyte salt with respect to the solvent was 1 mol/kg. The electrolyte salt was thereby dispersed or dissolved in the solvent. As a result, the electrolytic solution was prepared.

(Assembly of Secondary Battery)

First, the test electrode 101 was placed inside the outer package cup 104, and the counter electrode 103 was placed inside the outer package can 102. Thereafter, the test electrode 101 placed inside the outer package cup 104 and the counter electrode 103 placed inside the outer package can 102 were stacked on each other, while the separator 105 (a porous polyolefin film having a thickness of 25 µm) impregnated with the electrolytic solution was interposed between the test electrode 101 and the counter electrode 103. The test electrode 101 and the counter electrode 102 were thereby each impregnated with a portion of the electrolytic solution contained in the separator 105. Lastly, the outer package can 102 and the outer package cup 104 were crimped to each other by means of the gasket 106 in a state where the test electrode 101 and the counter electrode 103 were stacked on each other with the separator 105 interposed therebetween. Accordingly, the test electrode 101, the counter electrode 103, the separator 105, and the electrolytic solution were sealed by the outer package can 102 and the outer package cup 104. As a result, the secondary battery of the coin type was assembled.

(Stabilization of Secondary Battery)

The secondary battery after being assembled was charged and discharged for one cycle in an ambient temperature environment (23° C. in temperature). Upon the charging, the secondary battery was charged with a constant current of 0.1 C until a voltage reached 4.2 V, and was thereafter charged with a constant voltage of 4.2 V until a current reached 0.05 C. Upon the discharging, the secondary battery was discharged with a constant current of 0.1 C until the voltage reached 3.0 V. Note that 0.1 C is a value of a current that causes a battery capacity (a theoretical capacity) to be completely discharged in 10 hours, and 0.05 C is a value of a current that causes the battery capacity to be completely discharged in 20 hours.

The film was thus formed on a surface of each of the test electrode 101 and the counter electrode 103, which brought the secondary battery into an electrochemically stable state. Thus, the secondary battery of the coin type was completed.

After the completion of the secondary battery, the positive electrode active material was analyzed by ICP optical emission spectrometry to measure each of the content CA (ppm) of aluminum and the content CM (ppm) of magnesium. The results of the analysis were as given in Table 2.

In addition, the surface of the positive electrode active material was analyzed by XPS to measure each of the abundances PAO, PAX, PMO, and PMX, and the sums PA and PM were each calculated. The results of the calculation were as given in Table 2.

Note that Table 2 indicates a magnitude relationship between the content CA and the content CM and a magnitude relationship between the sum PA and the sum PM. In terms of the magnitude relationship between the content CA and the content CM, "Large" indicates that the content CA is greater than the content CM, and "Small" indicates that the content CA is less than the content CM. In addition, in terms of the magnitude relationship between the sum PA and the sum PM, "Large" indicates that the sum PM is greater than the sum PA, and "Small" indicates that the sum PM is less than the sum PA.

The secondary batteries were evaluated for their performance (the initial capacity characteristic, the cyclability characteristic, and the storage characteristic). The results of the evaluation are presented in Table 2.

(Initial Capacity Characteristic)

The secondary battery was charged and discharged for one cycle in a high-temperature environment (45° C. in temperature) to thereby measure a discharge capacity (an initial capacity (mAh)). Upon the charging, the secondary battery was charged with a constant current of 10 mA until a voltage reached 4.45 V, and was thereafter charged with a constant voltage of 4.45 V until a total charging time reached 2.5 hours. Upon the discharging, the secondary battery was discharged with a constant current of 9 mA until the voltage reached 3.0 V.

(Cyclability Characteristic)

In accordance with the procedure described above, the initial capacity was measured in the high-temperature environment (45° C. in temperature), following which the secondary battery was repeatedly charged and discharged in the same environment until the total number of cycles reached 500 cycles to thereby measure the discharge capacity (a 500th-cycle discharge capacity). Charging and discharging conditions for second and subsequent cycles were similar to those in an initial cycle. The following was thereby calculated: capacity retention rate (%)=(500th-cycle discharge capacity/initial capacity)×100.

(Storage Characteristic)

First, the secondary battery was charged, following which the secondary battery in a charged state was stored in a high-temperature environment (60° C. in temperature) for a storage period of time of 14 days. A charging condition was similar to that in the case of evaluating the initial capacity characteristic. Thereafter, the secondary battery after being stored was disassembled to collect the counter electrode 103 (the negative electrode). Thereafter, the counter electrode 103 was boiled in 15 ml (i.e., 15 cm$^3$) of hydrochloric acid having a concentration of 1 mol/kg for a boiling time of 15 minutes, following which the hydrochloric acid was filtered to thereby obtain a sample (a solution) for analysis. Thereafter, the sample was analyzed by ICP optical emission spectrometry to thereby measure a concentration of cobalt in the sample. Lastly, an elution amount of cobalt was calculated on the basis of the following expression: elution amount of cobalt=concentration of cobalt/weight of positive electrode active material.

Note that values of the elution amount listed in Table 2 are values each normalized with respect to the value of the elution amount in Example 5 assumed as 100.

TABLE 1

| | Li compound Kind | Co compound Kind | Al compound Kind | Al compound D50 (μm) | Al compound Molar ratio | Stirring time (hour) | Al compound Mixture Kind | Al compound Mixture amount (ppm) | Mg compound Mixture Kind | Mg compound Mixture amount (ppm) | Additional compound Kind | Firing time (hour) |
|---|---|---|---|---|---|---|---|---|---|---|---|---|
| Ex. 1 | Li$_2$CO$_3$ | CoO$_2$ | Al$_2$O$_3$ | 1 | 0.01 | 0.25 | Al$_2$O$_3$ | 500 | MgO$_2$ | 500 | LiF + MgF$_2$ | 5 |
| Ex. 2 | | | | 1 | 0.01 | 0.5 | | 500 | | 500 | | 5 |
| Ex. 3 | | | | 1 | 0.01 | 1 | | 500 | | 500 | | 5 |
| Ex. 4 | | | | 0.7 | 0.01 | 1 | | 500 | | 500 | | 5 |
| Ex. 5 | | | | 0.7 | 0.015 | 1 | | 500 | | 500 | | 5 |
| Ex. 6 | | | | 0.7 | 0.02 | 1 | | 500 | | 500 | | 5 |
| Ex. 7 | | | | 0.7 | 0.025 | 1 | | 500 | | 500 | | 5 |
| Ex. 8 | | | | 0.7 | 0.038 | 1 | | 500 | | 500 | | 5 |
| Ex. 9 | | | | 0.7 | 0.02 | 1 | | 500 | | 500 | Li$_3$PO$_4$ + Mg$_3$(PO$_4$)$_2$ | 5 |
| Ex. 10 | | | | 0.7 | 0.02 | 1 | | 500 | | 500 | Li$_2$S + MgS | 5 |
| Compar. 11 | Li$_2$CO$_3$ | CoO$_2$ | Al$_2$O$_3$ | 1 | 0.01 | 0.1 | Al$_2$O$_3$ | 500 | MgO$_2$ | 500 | LiF + MgF$_2$ | 5 |
| Compar. 12 | | | | 2 | 0.01 | 0.1 | | 500 | | 500 | LiF + MgF$_2$ | 5 |
| Compar. 13 | | | | 1 | 0.005 | 1 | | 200 | | 1600 | | 5 |
| Compar. 14 | | | | 1 | 0.005 | 1 | | 100 | | 3000 | | 5 |
| Compar. 15 | | | | 2 | 0.01 | 0.1 | | 100 | | 3000 | | 5 |
| Compar. 16 | | | | 1 | 0.01 | 0.25 | | 500 | | 500 | — | 5 |

TABLE 2

Lithium composite oxide (constituent elements = Li, Co, Al, Mg, X (F, P, or S), O)

| | ICP optical emission spectrometry Content CA (ppm) | ICP optical emission spectrometry Content CM (ppm) | ICP optical emission spectrometry Magnitude relationship | XPS Sum PA | XPS Sum PM | XPS Magnitude relationship | Initial capacity (mAh) | Capacity retention rate (%) | Elution amount (—) |
|---|---|---|---|---|---|---|---|---|---|
| Ex. 1 | 3800 | 500 | Large | 2.1 | 2.5 | Large | 180 | 86.0 | 120 |
| Ex. 2 | 3800 | 500 | Large | 1.8 | 2.8 | Large | 180 | 88.0 | 110 |
| Ex. 3 | 3800 | 500 | Large | 1.3 | 3.0 | Large | 181 | 87.0 | 110 |
| Ex. 4 | 3800 | 500 | Large | 0.8 | 3.3 | Large | 181 | 88.0 | 105 |
| Ex. 5 | 4500 | 500 | Large | 0.3 | 3.4 | Large | 181 | 90.0 | 100 |
| Ex. 6 | 5500 | 500 | Large | 0.1 | 3.6 | Large | 178 | 92.0 | 90 |
| Ex. 7 | 6500 | 500 | Large | 0.4 | 3.2 | Large | 177 | 92.5 | 85 |
| Ex. 8 | 7800 | 500 | Large | 0.4 | 3.4 | Large | 176 | 92.6 | 81 |
| Ex. 9 | 5500 | 500 | Large | 0.3 | 3.1 | Large | 180 | 89.0 | 105 |
| Ex. 10 | 5500 | 500 | Large | 0.3 | 2.9 | Large | 180 | 89.0 | 110 |
| Compar. 11 | 3800 | 500 | Large | 2.8 | 2.5 | Small | 180 | 82.0 | 150 |
| Compar. 12 | 3800 | 500 | Large | 4.0 | 2.5 | Small | 180 | 81.0 | 170 |
| Compar. 13 | 1550 | 1600 | Small | 1.1 | 2.8 | Large | 179 | 78.0 | 140 |
| Compar. 14 | 1450 | 3000 | Small | 0.9 | 5.8 | Large | 178 | 75.0 | 140 |
| Compar. 15 | 1450 | 3000 | Small | 9.5 | 0.5 | Small | 177 | 70.0 | 200 |
| Compar. 16 | 3800 | 400 | Large | 2.1 | 1.4 | Small | 180 | 72.0 | 140 |

As given in Table 2, the initial capacity characteristic, the cyclability characteristic, and the storage characteristic each varied depending on the physical property of the positive electrode active material (the lithium composite oxide).

Specifically, in a case where both of the physical property condition 1 regarding the result of the analysis by ICP optical emission spectrometry (content CA>content CM) and the physical property condition 2 regarding the result of the analysis by XPS (sum PM>sum PA) were satisfied (Examples 1 to 10), the capacity retention rate was increased and the elution amount was decreased while the initial capacity was ensured, as compared with the case where neither of the physical property conditions 1 and 2 was satisfied (Comparative example 11 to 16). That is, the decomposition reaction of the electrolytic solution caused by the reactivity of the positive electrode active material (the lithium composite oxide) was suppressed, and thus the capacity retention rate was increased while the initial capacity was ensured. In addition, the crystal structure of the positive electrode active material was stabilized. As a result, the elution amount of cobalt was decreased.

In particular, in a case where both of the physical property conditions 1 and 2 were satisfied, a series of tendencies described below was obtained. Firstly, in a case where the molar ratio of cobalt was greater than the molar ratio of each of the aluminum, magnesium, and the additional element in the positive electrode active material (the lithium composite oxide), a sufficient initial capacity was obtained. Secondly, in a case where the content CA was greater than or equal to 4500 ppm, the capacity retention rate was further increased and the elution amount was further decreased while the initial capacity was ensured. In this case, in a case where the content CA was less than or equal to 7800 ppm, a higher initial capacity was obtained while a high capacity retention rate was obtained and the elution amount was sufficiently decreased. Thirdly, in a case where the sum PM was greater than or equal to 2.9 and where the sum PA was less than or equal to 0.4, the capacity retention rate was further increased and the elution amount was further decreased while the initial capacity was ensured. Fourthly, in a case where the additional element was used, a common advantage was obtained that the capacity retention rate was increased and the elution amount was decreased while the initial capacity was ensured, regardless of phosphorus A the kind of the additional element (fluorine, phosphorus, or sulfur).

As is apparent from the results given in Table 2, in a case where the positive electrode active material (the lithium composite oxide of the layered rock-salt type) included lithium, cobalt, aluminum, magnesium, the additional element, and oxygen as constituent elements and where both of the physical property condition 1 regarding the result of analysis by ICP optical emission spectrometry and the physical property condition 2 regarding the result of analysis by X-ray photoelectron spectroscopy were satisfied, the capacity retention rate was increased and the elution amount was decreased while the initial capacity was ensured. Accordingly, a superior initial capacity characteristic, a superior cyclability characteristic, and a superior storage characteristic of the secondary battery were obtained.

Although the present technology has been described above with reference to one or more embodiments including Examples, the configuration of the present technology is not limited thereto, and is therefore modifiable in a variety of ways.

Specifically, the description has been given of the case where the secondary battery has a battery structure of the laminated-film type or the coin type. However, the battery structure is not particularly limited, and may be of any other type, such as a cylindrical type, a prismatic type, or a button type.

Further, the description has been given of the case where the battery device has a device structure of the wound type. However, the device structure of the battery device is not particularly limited, and may be of any other type, such as a stacked type in which the electrodes (the positive electrode and the negative electrode) are stacked, or a zigzag folded type in which the electrodes (the positive electrode and the negative electrode) are folded in a zigzag manner.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

Note that each of the positive electrode active material and the positive electrode described above may be applied not only to a secondary battery but also to another electrochemical device such as a capacitor.

The effects described herein are mere examples, and effects of the present technology are therefore not limited to those described herein. Accordingly, the present technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A positive electrode active material for a secondary battery, the positive electrode active material comprising a lithium composite oxide of a layered rock-salt type, wherein
   the lithium composite oxide includes lithium, cobalt, aluminum, magnesium, an additional element, and oxygen as constituent elements, the additional element including at least one of fluorine, phosphorus, or sulfur,
   according to an analysis of the positive electrode active material by inductively coupled plasma optical emission spectrometry, a content of aluminum is greater than a content of magnesium, and
   according to an analysis of a surface of the positive electrode active material by X-ray photoelectron spectroscopy, a sum of an abundance of chemical bonds between magnesium and oxygen and an abundance of chemical bonds between magnesium and the additional element is greater than a sum of an abundance of chemical bonds between aluminum and oxygen and an abundance of chemical bonds between aluminum and the additional element.

2. A positive electrode for a secondary battery, the positive electrode comprising a positive electrode active material, wherein
   the positive electrode active material includes a lithium composite oxide of a layered rock-salt type,
   the lithium composite oxide includes lithium, cobalt, aluminum, magnesium, an additional element, and oxygen as constituent elements, the additional element including at least one of fluorine, phosphorus, or sulfur,
   according to an analysis of the positive electrode active material by inductively coupled plasma optical emission spectrometry, a content of aluminum is greater than a content of magnesium, and according to an analysis of a surface of the positive electrode active material by X-ray photoelectron spectroscopy, a sum of an abundance of chemical bonds between magnesium and oxygen and an abundance of chemical bonds between magnesium and the additional element is greater than a sum of an abundance of chemical bonds between aluminum and oxygen and an abundance of chemical bonds between aluminum and the additional element.

3. A secondary battery comprising:

a positive electrode including a positive electrode active material;

a negative electrode; and an electrolytic solution, wherein the positive electrode active material includes a lithium composite oxide of a layered rock-salt type, the lithium composite oxide includes lithium, cobalt, aluminum, magnesium, an additional element, and oxygen as constituent elements, the additional element including at least one of fluorine, phosphorus, or sulfur, according to an analysis of the positive electrode active material by inductively coupled plasma optical emission spectrometry, a content of aluminum is greater than a content of magnesium, and according to an analysis of a surface of the positive electrode active material by X-ray photoelectron spectroscopy, a sum of an abundance of chemical bonds between magnesium and oxygen and an abundance of chemical bonds between magnesium and the additional element is greater than a sum of an abundance of chemical bonds between aluminum and oxygen and an abundance of chemical bonds between aluminum and the additional element.

4. The secondary battery according to claim 3, wherein a molar ratio of cobalt is greater than a molar ratio of each of aluminum, magnesium, and the additional element.

5. The secondary battery according to claim 3, wherein the content of aluminum is greater than or equal to 4500 parts per million.

6. The secondary battery according to claim 5, wherein the content of aluminum is less than or equal to 7800 parts per million.

7. The secondary battery according to claim 3, wherein
the sum of the abundance of the chemical bonds between magnesium and oxygen and the abundance of the chemical bonds between magnesium and the additional element is greater than or equal to 2.9, and
the sum of the abundance of the chemical bonds between aluminum and oxygen and the abundance of the chemical bonds between aluminum and the additional element is less than or equal to 0.4.

8. The secondary battery according to claim 3, wherein the secondary battery comprises a lithium-ion secondary battery.

* * * * *